(12) United States Patent
Go et al.

(10) Patent No.: US 12,529,903 B2
(45) Date of Patent: Jan. 20, 2026

(54) ACTUATOR FOR REFLECTOMETER

(71) Applicant: JAHWA electronics Co., Ltd., Cheongju-si (KR)

(72) Inventors: Jae Yong Go, Chungju-si (KR); Chul Soon Park, Cheongju-si (KR)

(73) Assignee: JAHWA electronics Co., Ltd., Cheongju-si (KR)

( * ) Notice: Subject to any disclaimer, the term of this patent is extended or adjusted under 35 U.S.C. 154(b) by 148 days.

(21) Appl. No.: 18/611,748

(22) Filed: Mar. 21, 2024

(65) Prior Publication Data

US 2025/0116877 A1 Apr. 10, 2025

(30) Foreign Application Priority Data

Oct. 10, 2023 (KR) .......................... 10-2023-0133978

(51) Int. Cl.
*G02B 27/64* (2006.01)
*G02B 7/182* (2021.01)
*G03B 5/00* (2021.01)

(52) U.S. Cl.
CPC ......... *G02B 27/646* (2013.01); *G02B 7/1821* (2013.01); *G03B 5/00* (2013.01); *G03B 2205/0007* (2013.01); *G03B 2205/0069* (2013.01)

(58) Field of Classification Search
CPC .............. G03B 5/00; G03B 2205/0007; G03B 2205/0069; G03B 17/17; G02B 7/1821; G02B 27/646
See application file for complete search history.

(56) References Cited

U.S. PATENT DOCUMENTS

| | | | |
|---|---|---|---|
| 2018/0224665 A1* | 8/2018 | Im .......................... | G03B 5/00 |
| 2021/0286193 A1* | 9/2021 | Kwon .................... | G02B 13/02 |
| 2022/0229310 A1* | 7/2022 | Park ....................... | G02B 7/182 |
| 2023/0185053 A1* | 6/2023 | Kim ...................... | G02B 7/1821 |
| | | | 359/555 |

\* cited by examiner

*Primary Examiner* — Christopher E Mahoney
(74) *Attorney, Agent, or Firm* — ZION IP; Byungwoong Park

(57) ABSTRACT

The embodiment disclosed herein is an actuator for reflectometer, the actuator comprising a carrier attached with a reflectometer and equipped with a first magnet; a middle guide to support the rotation of the carrier about a first direction; at least one first ball positioned between the carrier and the middle guide; a second magnet equipped to the middle guide; a pulling magnet equipped to the carrier and facing the second magnet; and a first coil to impart a driving force to the first magnet; wherein the pulling magnet comprises a counterpart magnetic pole having an opposite polarity to a facing magnetic pole of the second magnet, with the facing magnetic pole being positioned towards the pulling magnet.

6 Claims, 11 Drawing Sheets

ACTUATOR FOR REFLECTOMETER

TECHNICAL FIELD

The present disclosure relates to actuators for reflectometers. More particularly, the present disclosure relates to actuators for reflectometers with improved driving precision through application of positional recovery.

BACKGROUND ART

Advances in hardware technology for image processing and growing consumer need for making and taking photos and videos have driven implementation of such functions as autofocusing (AF) and optical image stabilization (OIS) in stand-alone cameras as well as camera modules mounted on mobile terminals including cellular phones and smartphones.

An autofocus (AF) function (or, an automatically focusing function) means a function of a focal length to a subject by linearly moving a carrier having a lens in an optical axis direction to generate a clear image at an image sensor (CMOS, CCD, etc.) located at the rear of the lens.

In addition, an optical image stabilization (OIS) function means a function of improving the sharpness of an image by adaptively moving the carrier having a lens in a direction to compensate for the shaking when the lens is shaken due to trembling.

One typical method for implementing the AF or OIS function is to install a magnet (a coil) on a mover (a carrier) and install a coil (a magnet) on a stator (a housing, or another type of carrier, or the like), and then generate an electromagnetic force between the coil and the magnet so that the mover moves in the optical axis direction or in a direction perpendicular to the optical axis.

Current mobile terminals are equipped with zoom lenses the specifications of which support such features as variable focal adjustments and taking pictures of long distance images to suit heightened consumer needs and to further user convenience.

Since zoom lenses as such are either structured as parallel arrays of multiple lens or lens assemblies or distinguished by extended lens dimensions along the optical axis, they accordingly demand larger space in the mobile terminals housing them.

As an effort to reconcile zoom lenses with such physical features seamlessly with the dimensions of mobile terminals, there have been recent developments in actuators and camera modules including those with physical structures in which the light from the object is refracted by means of a reflectometer placed anterior to the lens.

Actuators as described above are equipped with reflectometers that reflects the light from the object toward the lens. They address camera shake by implementing optical image stabilization (OIS) in which the reflectometer is driven along one or two axes.

These devices mostly rely on designs in which a moving body equipped with a reflectometer is driven by rotation along a path such as a rail, propped up by balls. A yoke made of magnetic material that generates attraction towards magnets accompanies such designs to maintain contact and adhesion to the balls.

Such designs allow the balls to maintain contact to the moving body as well as the fixed body through attraction from the yoke pulling the moving body towards the fixed body via the medium of interposing balls.

Unlike conventional optical image stabilization mechanisms which are implemented by linear movement, devices equipped with reflectometers such as actuators rely on rotational movement of the reflectometer for OIS to leave the reflectometer upon the conclusion of the OIS operation remaining at the last position, i.e., at a random position.

Art-known actuators thus have been able to provide adhesion (attraction) by the yoke, but incapable of restoring the reflectometer or a moving body (e.g., the carrier) attached with it back to a preset default position. And such lack of positional recovery impaired immediacy in response and driving precision because this made a necessary prerequisite the additional locating process for current position of the reflectometer after the end of OIS.

SUMMARY

Technical Problem

The present invention has been contemplated to solve the aforementioned problems in the context mentioned above. It is a technical goal of the present invention to provide an actuator for reflectometer with adhesion between the moving body and the fixed body as well as restoring force to return the moving body back a preset default position by a configuration pairing facing magnetic poles to confront counterpart magnetic poles. Such configuration enhances not only the response rate of OIS, but also driving precision.

Other technical goals and advantages of the present invention can be understood with reference to the description below, which will be made explicit by the accompanied examples. Furthermore, the technical goals and advantages of the present invention can be accomplished by the embodiments and their combinations recited in the attached claims.

Technical Solution

To achieve the technical goals mentioned above, in one aspect of the present invention an actuator for reflectometer may comprise a carrier attached with a reflectometer and equipped with a first magnet; a middle guide to support the rotation of the carrier about a first direction; at least one first ball positioned between the carrier and the middle guide; a second magnet equipped to the middle guide; a pulling magnet equipped to the carrier and facing the second magnet; and a first coil to impart a driving force to the first magnet.

In this embodiment, the pulling magnet may comprise a counterpart magnetic pole having an opposite polarity to a facing magnetic pole of the second magnet, with the facing magnetic pole being positioned towards the pulling magnet.

In addition, the counterpart magnetic pole is preferably positioned in correspondence to the location of the facing magnetic pole.

Preferably, the pulling magnet has a shape elongated along a direction running parallel to the length of the second magnet.

In which case, the rotation of the carrier about the first direction preferably takes place within a plane perpendicular to the direction toward which the carrier faces the middle guide.

Depending on the particular embodiment, the actuator of the present invention further comprises a housing to support the rotation of the middle guide about a second direction; at least one second ball positioned between the housing and the middle guide; and a second coil to impart a driving force to the second magnet.

Preferably, the present invention may further comprise a back yoke which is equipped to the middle guide, and is located facing a side of the second magnet opposite to the side thereof facing the second coil, and has an opening formed in the area through which the second magnet faces the pulling magnet.

Furthermore, the pulling magnet preferably has a surface facing the second magnet such that the peripheries of said surface are wider than the central region of said surface.

Advantageous Effects

According to a preferred embodiment of the present disclosure, configuring magnetic poles to face their symmetrical counterparts generates attractive force that not only tightens the contact between the moving and fixed bodies but also provides restoring force to return the moving body to a default position.

In particular, the present invention employs the attraction between the magnetic poles and their counterpart magnetic poles to induce rotation of the reflectometer, which in turn restores the reflectometer to its default position. Thus, the present invention helps provide an actuator optimal for implementing optical image stabilization through rotation of the reflectometer.

According to another preferred embodiment of the present disclosure, the physical shape of the pulling magnet in which the peripheries are wider than the central region, allows more effective generation of torque for rotation without sacrificing attractive force.

Furthermore, the present invention facilitates structural design by allowing the magnet for OIS operation to double as a magnet for generating attractive force towards the pulling magnet.

Moreover, the present invention provides a structurally improved back yoke for purposes such as focusing and leak prevention of the magnetic force, thereby effectively strengthening driving force of the driving magnet as well as attractive and restoring forces from the pulling magnet.

BRIEF DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION OF EXEMPLARY EMBODIMENTS

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
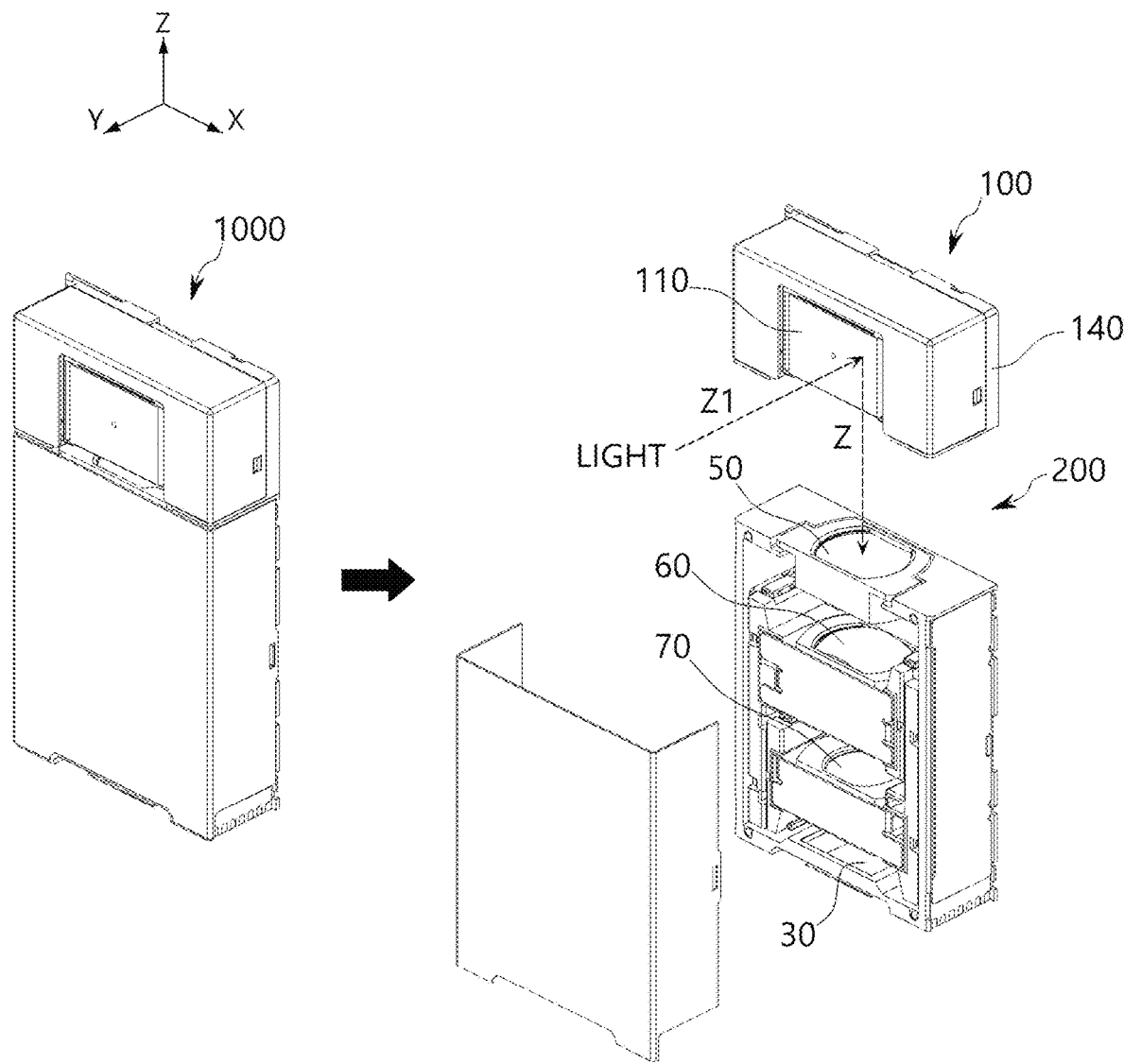
FIGS. 1 and 2 illustrate the overall configuration of an actuator for reflectometer and a camera module in accordance with a preferred embodiment of the present invention.
Figure 2:
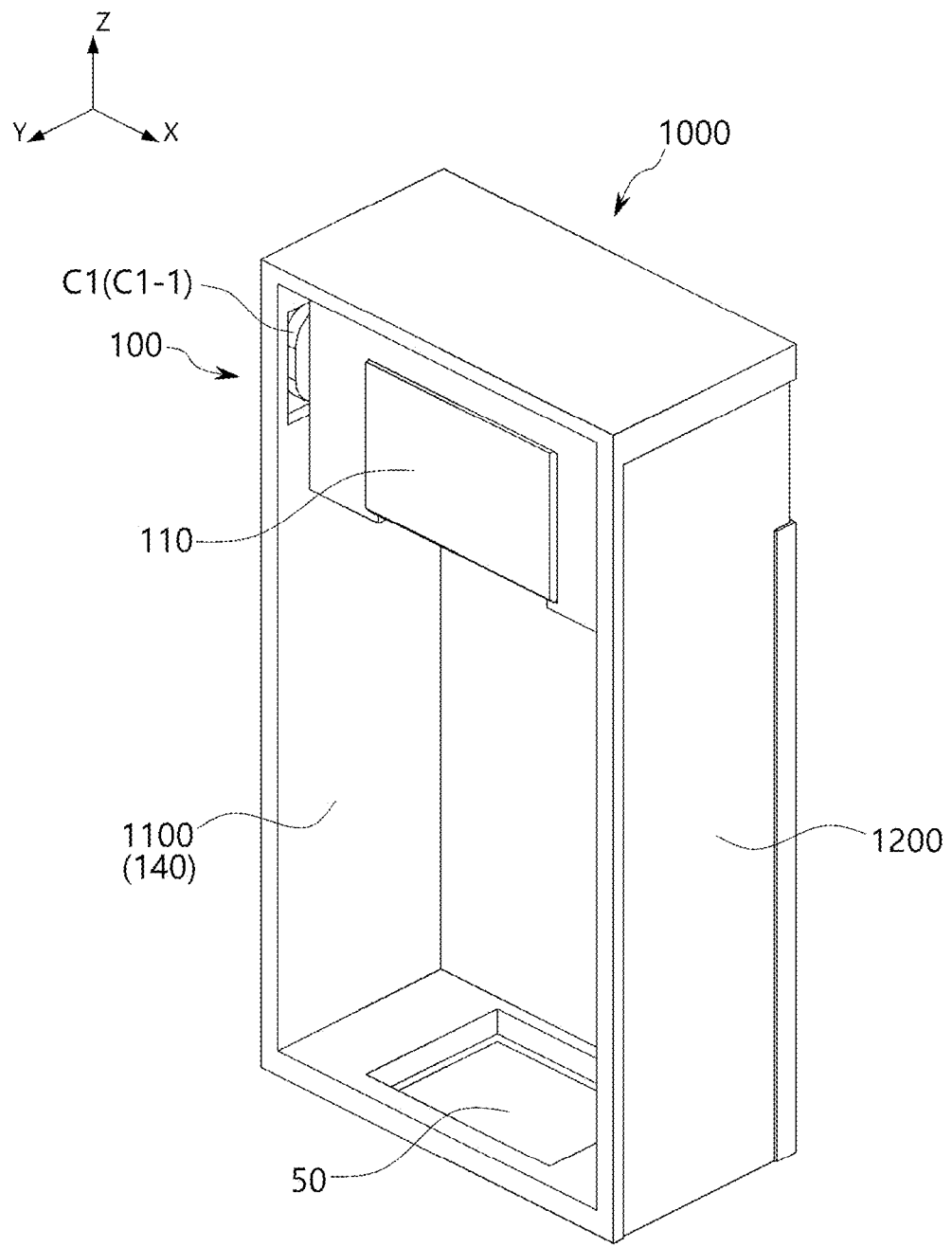

FIGS. 1 and 2 depict the overall configuration of an actuator for reflectometer (hereinafter referred to simply as "actuator") (100) and a camera module (1000) comprising it in accordance with a preferred embodiment of the present invention.

The actuator (100) of the present invention can be embodied as part of a camera module (1000) along with such other parts as one or more lenses (50, 60, 70), a lens driving module (200) to implement zooming and/or autofocusing and an image sensor (30) as illustrated in FIG. 1, or needless to say, as a single stand-alone device.

In the actuator (100) of the present invention, light from the object does not enter directly into the lenses (50, 60, 70), but its path is modified (refracted, reflected, etc.) by a reflectometer (110) equipped to the actuator (100) of the present invention before entering the lenses (50, 60, 70).

As illustrated in FIG. 1, the path of light entering from the outside is designated Z1, while the path of light that enters from the outside and becomes reflected or refracted by the reflectometer (110) into the lenses (50, 60, 70) is designated Z.

As described hereinafter, the Z-axis which corresponds to the direction of the entry of light towards the lenses (50, 60, 70) is designated the optical axis or the direction of the optical axis and each of the two directions that run perpendicular to the optical axis is designated respectively as the X-axis and Y-axis.

Image sensors (30) such as complementary metal oxide semiconductor (CMOS) and charge coupled device (CCD) may be placed posterior to the lenses (50, 60, 70) along the optical axis to convert the optical signal into an electrical one together with filters to either block or pass certain bandwidths of light signal. Depending on the embodiments, the lenses (50, 60, 70) may differ in terms of numbers and positions than those illustrated in the drawings.

As will be described in detail afterwards, the actuator (100) of the present invention is a device that implements optical image stabilization (OIS) operations by rotating the reflectometer (110) in a compensatory direction against a disturbance in directions of the X- and/or Y-axes, i.e., perpendicular to the optical axis, when the disturbance is a camera shake occurred along the Y- and/or ±X-axes.

As illustrated in FIG. 1, the actuator (100) of the present invention can be embodied as a single stand-alone device working in conjunction with other parts that constitute a camera module (1000), or it can be embodied in many other ways, such as the illustration in FIG. 2 where it is included within the housing (1100) for the camera module (1000).

In such case, the housing (140), which is one of the many parts constituting the actuator (100), may be the very housing for the actuator (100) or it could be the housing (1100) for the camera module (1000).

It should be obvious to a skilled practitioner that the axes depicted in the drawings herein, the references to these axes, and the terms herein defining directions in reference to the particular axis in question such as upper, lower, front, rear, vertical and horizontal are used simply to provide a relative standard in describing the embodiments of the present invention and are not intended to define in absolute terms a particular direction or position. It should be readily apparent that such direction or position may vary in relation to the factors such as the position of the object in question, the position of the viewer and the direction of the view.

For the purpose of describing the embodiments of the present invention, hereinafter, the Z-axis will be the reference point for defining upper and lower or the vertical direction. In a similar wise, the Y-axis will be the reference point for defining front and rear, whereas the X-axis will be the reference point for left and right.

For the actuator (100) in accordance with an embodiment of the present invention, as illustrated hereinafter, the XZ-plane or a plane parallel to it becomes the plane in which the carrier (120) rotates about the middle guide (130) serving as a fixed body in the relative sense (see FIG. 5), while the YZ-plane is the plane in which the middle guide (130) of the present invention, along with the carrier (120), rotates with respect to the housing (140, 1100) (see FIG. 6).

Figure 3:
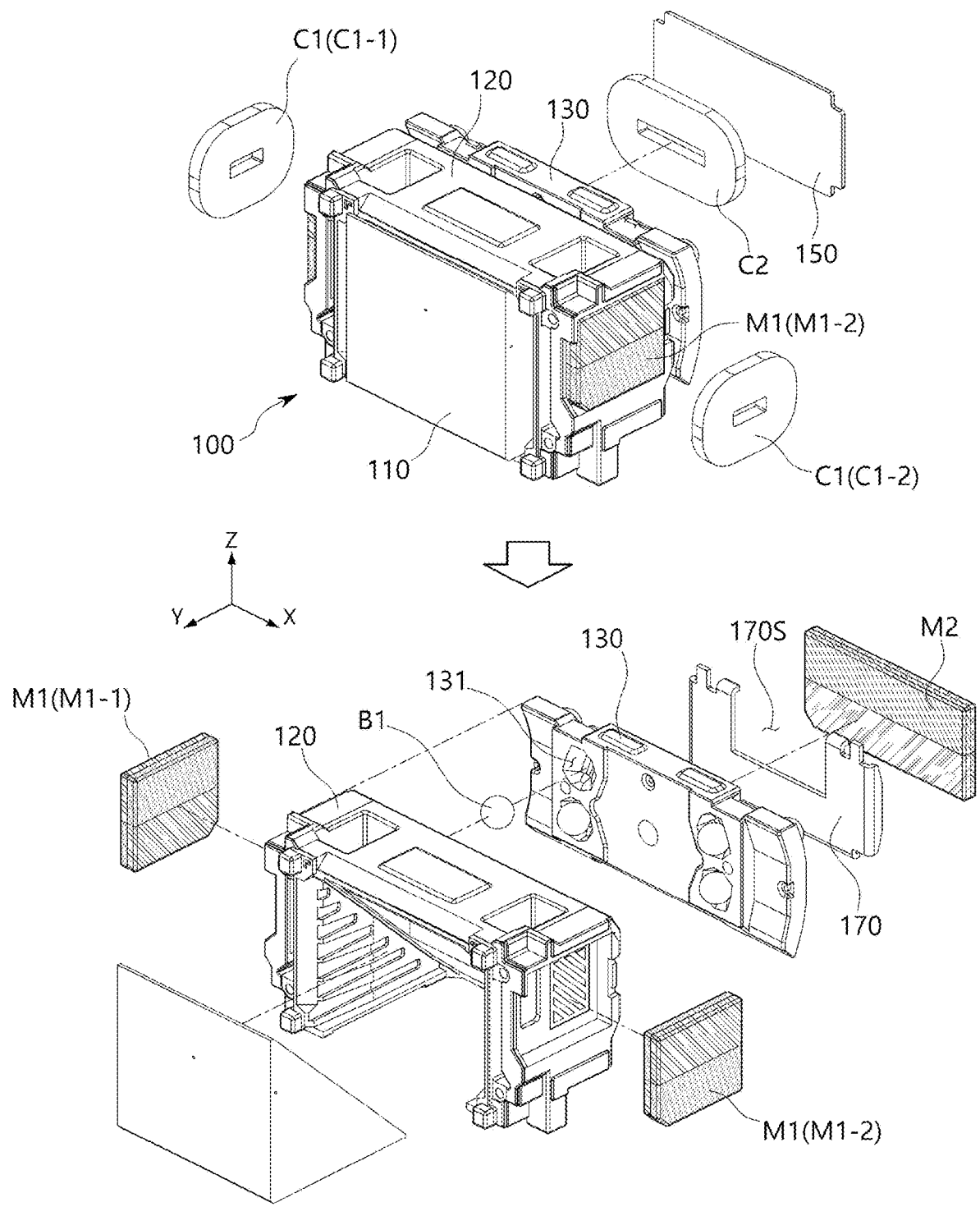
FIGS. 3 and 4 illustrate the configuration in detail of the actuator for reflectometer according to a preferred embodiment of the present invention.
Figure 4:
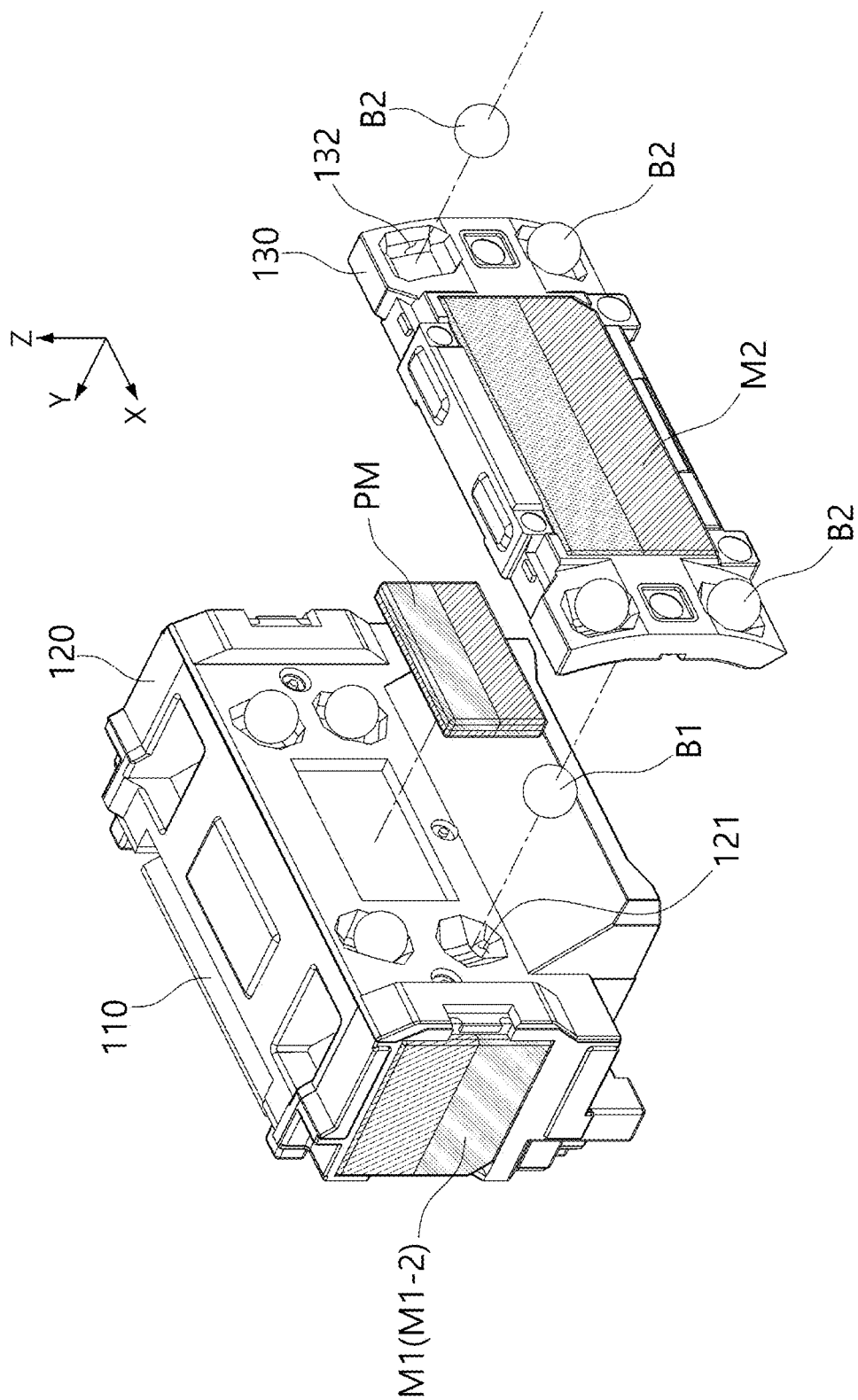

FIGS. 3 and 4 illustrate exploded views of the actuator (100) in detail according to an embodiment of the present invention.

As illustrated in FIG. 3, the actuator (100) in accordance with an embodiment of the present invention may comprise a reflectometer (110), a carrier (120), a middle guide (130) and a housing (140). As previously described, the housing (140) for the actuator (100) may as well be the housing (1100) for the camera module (1000).

The present invention will be first described with regards to the overall configuration for the actuator (100) in reference to the drawings while further descriptions will follow for the detailed configuration required for OIS in each direction as well as the relationship among the elements for driving.

As previously described, the incident light from the object entering the actuator (100) of the present invention along path Z1 is modified (e.g., reflected, refracted) by the reflectometer (110) of the present invention towards the optical axis (Z) to pass the lenses (50, 60, 70).

The reflectometer (110) may consist of one selected from a mirror, a prism or a combination of both and it should be obvious that the reflectometer (110) can be constructed from a variety of material capable of modifying the path of the incoming light from the outside toward the optical axis. This design of the present invention in which the path of light is refracted by the reflectometer (110) before it enters the lenses (50, 60, 70), frees the lens driving module (200) from having to be installed across the width of the mobile terminal (e.g., smartphones), and thus is optimal for slimming of mobile terminals since even optical elements with extended dimensions along the optical axis such as zoom lens can be accommodated without making the mobile terminal thicker.

As well known in the art, OIS is implemented in a direction that compensates the disturbance caused by camera shake e.g., by operating the lens to move. In the embodiments of the present invention, however, OIS can be implemented by rotating the reflectometer (110) rather than, e.g., setting the lens on a countervailing motion.

The reflectometer (110) of the present invention is attached facing in the direction from which light come into the actuator (100), i.e., front in direction of the Y-axis. As the reflectometer (110) is fixed to the carrier (120), it is inseparable from the carrier (120) in physical movement.

When the carrier (120) of the present invention rotates (in the XZ-plane) about the middle guide (130) (serving as a fixed body in relative sense) or when the middle guide (130) of the present invention rotates (in the YZ-plane), along with the carrier (120), about the housing (140) (serving as a fixed body in relative sense), so turns the reflectometer (110) attached to the carrier (120) in the same direction.

Preferably, at least one first ball (B1) can be placed between the carrier (120) and the middle guide (130) while at least one second ball (B2) can be placed between the middle guide (130) and the housing (140).

By means of these interposed balls (B1, B2) the moving body is enabled to move more smoothly thanks to minimized friction through their action, e.g., rolling, rotation and making point contacts with the objects they face. Furthermore, noise and the required driving force are reduced and driving precision is improved.

As will be described later, when the carrier (120) attached with the reflectometer (110) rotates in the XZ-plane about the middle guide (130), serving as a fixed body in relative sense (see FIG. 5), the path of incoming light towards the image sensor (30) is shifted in the direction of the X-axis by the rotation of the reflectometer (110), thereby making corrections to the X-axis component of the camera shake.

Furthermore, when the carrier (120) attached with the reflectometer (110) rotates along with the middle guide (130) in the YZ-plane (see FIG. 65), the path of incoming light towards the image sensor (30) is shifted in the direction of the Y-axis by the rotation of the reflectometer (110), thereby making corrections to the Y-axis component of the camera shake.

Hereinafter, the direction in which the reflectometer (110) rotates in (a plane parallel to) the XZ-plane for the purpose of making corrections to a camera shake in the X-axis will be designated as "the first direction" while the direction in which the reflectometer (110) rotates in (a plane parallel to) the YZ-plane for the purpose of making corrections to a camera shake in the Y-axis will be designated as "the second direction". In this sense, the middle guide (130) of the present invention will be a fixed body in the relative sense for rotation in the first direction with respect to the carrier (120), but it will be a moving body in the relative sense for rotation in the second direction with respect to the housing (140).

As illustrated in FIGS. 3 and 4, the middle guide (130) may be equipped with a second magnet (M2) for driving OIS operation in the second direction.

Depending on the embodiment, the second magnet (M2) is equipped to the middle guide (130) in the presence of a back yoke (170) interposed in between for the purpose of focusing and leak prevention of magnetic force between the second coil (C2) and the second magnet (M2) to strengthen the force.

The pulling magnet (PM) is one of the characteristic elements of the present invention and is equipped to the carrier (120) in a direction facing the second magnet (M2) as illustrated in the drawings. Referring to FIG. 4, the pulling magnet (PM) is equipped to the carrier (120) on its rear face (along the Y-axis), and with respect to the middle guide (130), it is located to the front (along the Y-axis) of the middle guide (130).

The pulling magnet (PM) comprises a magnetic pole (hereinafter referred to as the "counterpart magnetic pole") that faces, and whose polarity is opposite to that of a facing magnetic pole, which is in turn one of the magnetic poles of the second magnet (M2) and directed towards the pulling magnet (PM). From the default position of the carrier (120), the counterpart magnetic pole is placed at a position matching that of the facing magnetic pole.

The pulling magnet (PM) induces attractive force toward the second magnet (M2) to guide tight contact of the carrier (120) equipped with the pulling magnet (PM) toward the middle guide (130).

Since the second magnet (M2) is equipped to the middle guide (130) and the pulling magnet (PM) is equipped to the carrier (120), the attractive force generated as mentioned between the pulling magnet (PM) and the second magnet (M2) pulls the carrier (120) towards the middle guide (130), drawing them close together with the first ball (B1) interposed in between.

For the purpose of explanation, it would be obvious that the second magnet (M2) may as well equipped to a fixed body such as the housing (140) instead to a moving body such as the second magnet (M2) in an embodiment where the actuator (100) of the present invention operates optical image stabilization only in the first direction. Thus, in such embodiments, the middle guide (130) serves only as a fixed body in the relative sense with respect to the carrier (120).

This arrangement mediated by attractive force helps e.g., to maintain the point contact between the first ball (B1) and the carrier (120) as well as between the first ball (B1) and the middle guide (130).

Furthermore, in the event of OIS operation in the first direction rotating the carrier (120) in the XZ-plane, the position or posture of the carrier (120) is restored by the pulling magnet (PM) to a position or posture in which the facing magnetic pole from the second magnet (M2) is aligned or in register with the counterpart magnetic pole from the pulling magnet (PM) upon completion or interrupt of the OIS operation.

Hereinafter, the actuator (100) will be described in detail in reference to FIGS. 5 and 6 for the detailed configuration and working relationship required for driving OIS operation in each direction.

As illustrated in the drawings, to the carrier (120) attached with a reflectometer (110) is equipped a first magnet (M1) for driving OIS operation in the first direction. For such purpose as enhancing driving efficiency, the first magnet (M1) may be equipped to both the left and right (M1-1, M1-2) of the carrier (120) as shown in the drawings.

The housing (140) is equipped with a first coil (C1) that faces the first magnet (M1). In embodiments with plural first magnets (M1), plural instances of first coil (C1-1, C1-2) can be employed accordingly.

Figure 5:
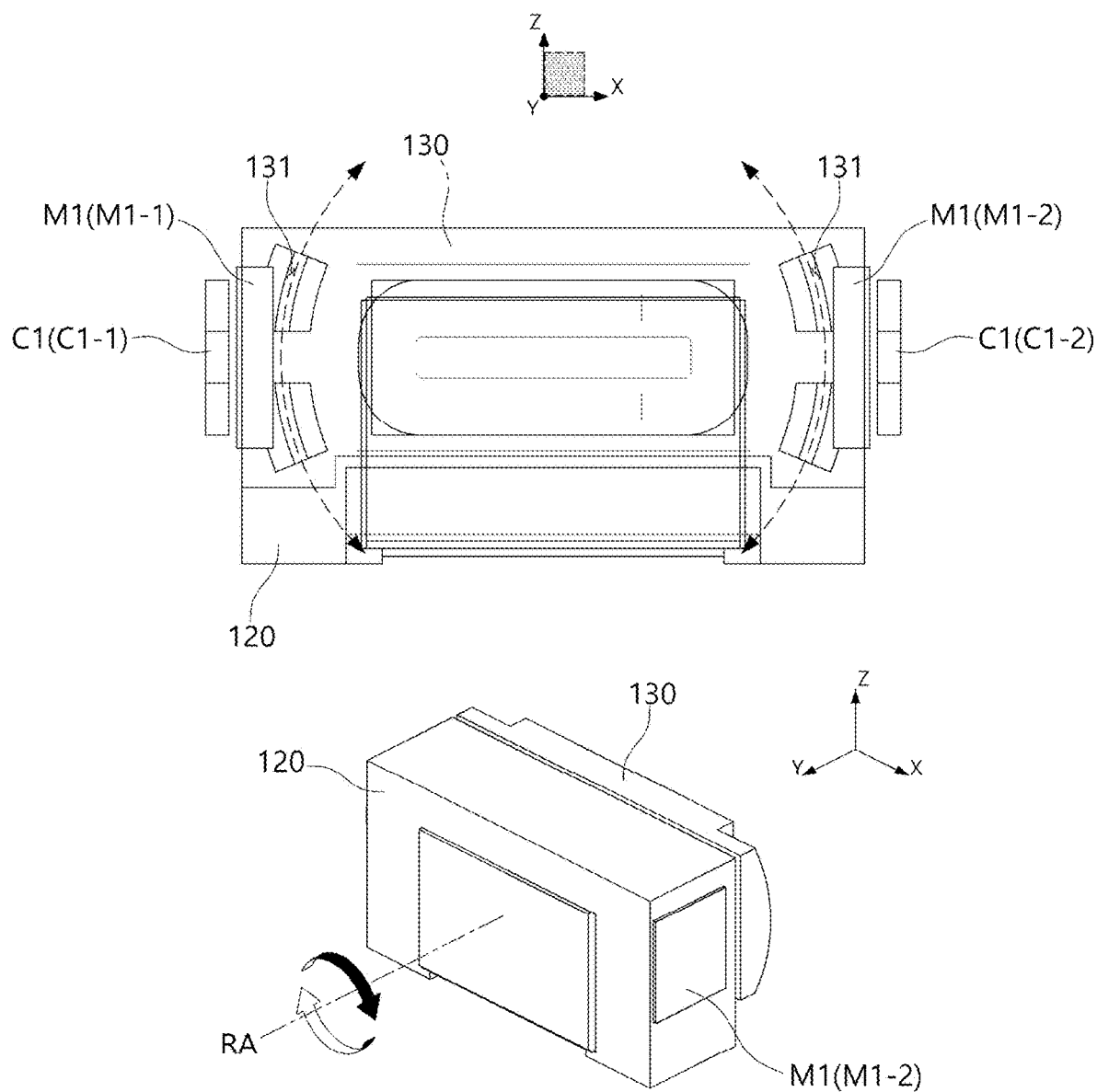
FIG. 5 illustrates the working relationship for the rotating reflectometer about a first direction.

Once power of appropriate magnitude and direction controlled e.g., by an operating drive (not shown), is applied to the first coil (C1) to generate (electro) magnetic force between the first coil (C1) and the first magnet (M1), the carrier (120) residing within its plane and facing the parallel plane of the middle guide (130), starts to rotate guided by the first ball (B1) (see FIG. 5). Through this rotation is implemented OIS operation in the X-axis direction, i.e., in the first direction. In such case, the axis of rotation (RA) for OIS operation in the first direction is the Y-axis.

As illustrated in the drawings, at least one first ball (B1) is placed between the carrier (120) and the middle guide (130). Placement of this first ball (B1) may be such that part of this first ball (B1) is accommodated between a first rail (131) and a first guide (121) attached to the carrier (120) in which the first rail (131), having a rounded shape (for example, a circular track), is formed on one of the surfaces of the middle guide (130) that faces the carrier (120).

Needless to say, either the first rail (131) or the first guide (121) can be shaped in the form of rail in which the rail groove extends continually or in its entirety. Alternatively, either the first rail (131) or the first guide (121) can be shaped in the form of a pocket to prevent the first ball (B1) from escaping.

In certain embodiments, the actuator may further comprise a detection sensor for OIS operation driving control. In such case, upon detecting the position of the carrier (120) (in particular of the first magnet (M1) or a sensing magnet equipped to the carrier (120)), the detection sensor sends a corresponding signal to the operating drive, and power of a magnitude and a direction responsive to this signal is applied towards the first coil (C1) through control by the operating drive.

The detection sensors may be implemented as Hall sensors which through the Hall effect, detect the magnitude and the direction change of magnetic field generated from magnets present within the region of detection to generate a responsive output signal.

Figure 6:
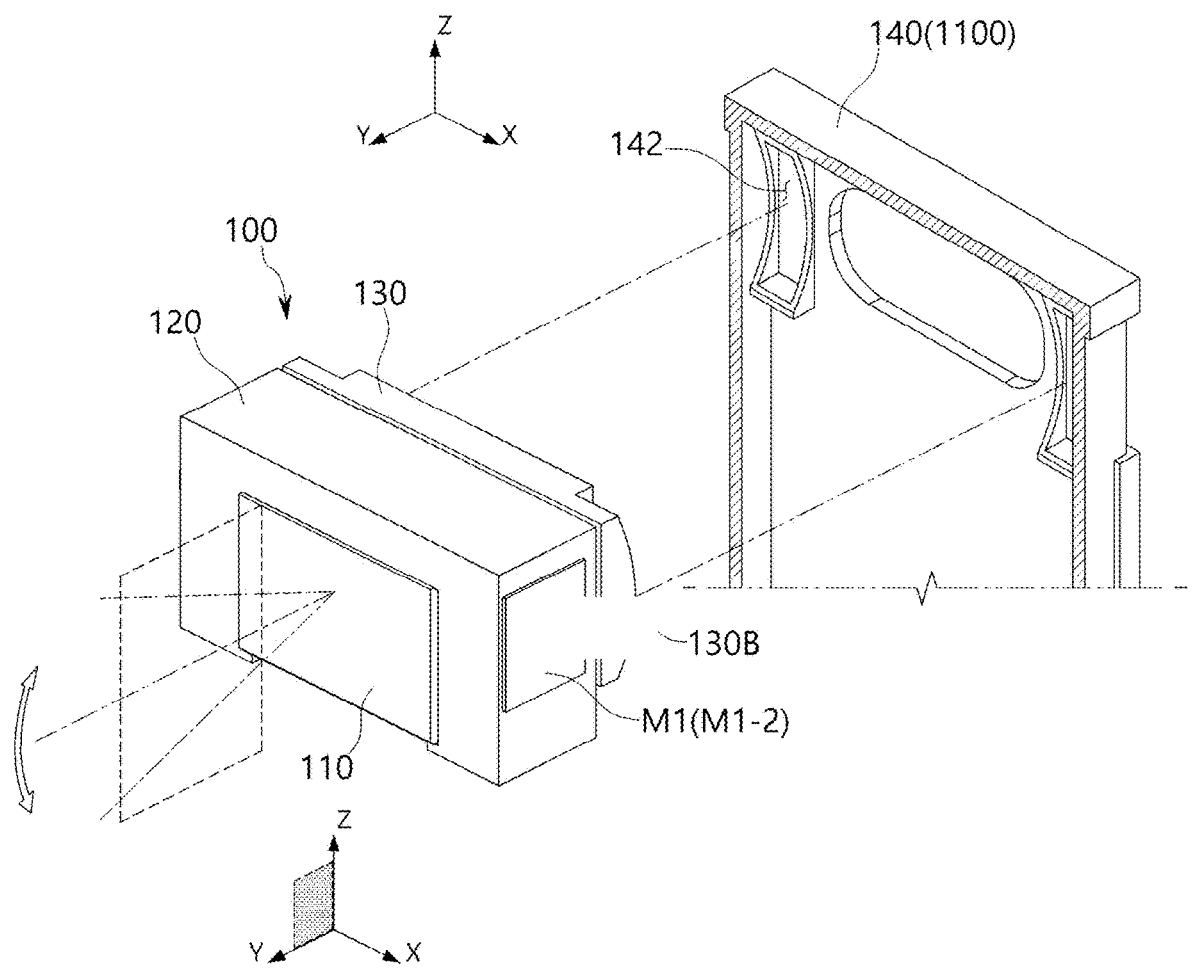
FIG. 6 illustrates the working relationship for the rotating reflectometer about a second direction.

Similarly as described above, once power of appropriate magnitude and direction is applied to the second coil (C2) e.g., through control by an operating drive (not shown) (electro) magnetic force is generated between the second coil (C2) and the second magnet (M2), and this force generated serves as driving force that rotates the middle guide (130), along with the carrier (120), about the housing (140) (as a fixed body in the relative sense) in the second direction (see FIG. 6).

In addition, a second rail (132) having a rounded shape is placed on the rear surface (130B) (based on the Y-axis) of the middle guide (130), and a second guide (142) is attached to the housing (140) that faces the rear surface of the middle guide (130) as illustrated.

In this embodiment, at least one second ball (B2) can be placed between the second rail (132) and the second guide (142). It would be obvious that the second rail and/or the second guide (142) may take the shape of an elongated groove so as to accommodate part of the second ball (B2) or may take the shape of a pocket to prevent the second ball (B2) from escaping as illustrated.

A yoke plate (150) is formed on the housing (140) which serves a fixed body in the relative sense with respect to the rotation of the middle guide (130) in the second direction. The yoke plate (150) generates attractive force towards the second magnet (M2) equipped to the middle guide (130). The attractive force between the yoke plate (150) and the second magnet (M2) helps keep contact, e.g., point-contact between the second ball (B2) and the middle guide (130) as well as between the second ball (B2) and the housing (140) to be maintained. Accordingly, the middle guide (130) is brought to intimate attachment with the housing (140) by the attractive force from the yoke plate (150) while the second rail (132) and the second guide (142) face each other through the interposing second ball (B2). Such arrangement causes the middle guide to rotate (in the second direction) with the second ball interposed in between along the round contours of the second rail (132) and/or the second guide (142) when magnetic force is generated between the second coil (C2) and the second magnet (M2).

In the driving of rotation about the first direction, the middle guide (130) of the present invention serves as a fixed body in the relative sense with respect to the carrier (120) and supports the rotation of the carrier (120) about the first direction. In addition, in the driving of rotation about the second direction, the housing (140) of the present invention serves as a fixed body in the relative sense with respect to the middle guide (130) and supports the rotation of the middle guide (130) about the second direction.

The first rail (131) formed on the middle guide (130) may take a round shape, e.g., a circular track in the XZ-plane as illustrated in the drawings to guide the rotation of the carrier (120) about the first direction. As for the second rail (132), it may take a round shape in the YZ-plane to guide the rotation of the middle guide (130) together with the carrier (120) about the second direction.

The first (131) and second (132) rails are formed at a perpendicular angle to each other and at least one second ball (B2) is placed, accommodated between the second rail (132) and the second guide (42). The second rail (132), the second ball (B2), the second guide (142) and the like therefore serve as physical structures blocking the rotation of the middle guide (130) when the carrier (120) rotates, e.g., with guidance from the first rail (131), about the first direction with respect to the middle guide (130) as a fixed body in the relative sense.

Such relationship of structural elements keeps the middle guide (130) in a fixed position with respect to the housing (140) even when (electro) magnetic force is generated between the first magnet (M1) and the first coil (C1).

Similarly as described above, when driving force is generated against the second magnet (M2) through the magnetic force between the second coil (C2) and the second magnet (M2), the middle guide (130), guided by the second rail (132) and the second guide (142) along with the second ball (B2) interposed in between, rotates about the second direction (within the YZ-plane).

In this case, the carrier (120) rotates together with the middle guide (130) about the second direction because the carrier (120) is forced to remain at the fixed position with respect to the middle guide (130) by the blocking structural elements of the first rail (131), the first ball (B1) and the first guide (121).

A group of elements including a first coil (C1), a second coil (C2), a Hall sensor and an operating drive can be mounted on a circuit board equipped to the camera module (1000) or to the actuator (100) itself. Such circuit board (1200) is preferably configured to have parts exposed to the outside to facilitate interfacing with an external module, a power supply, an external device, etc.

Along with the first ball (B1), the first guide (121) and the first rail (131) serve the functions of physically supporting and guiding the rotation of the carrier (120) with respect to the middle guide (130) as a fixed body in the relative sense. In such an arrangement, the tilt or spacing of the carrier (120) can be accordingly kept at a minimum and its rotation about the first direction accordingly made more stable when the pulling magnet (PM) takes up the middle part of the rear surface of the carrier (120) and the first guide (121) is formed outside the pulling magnet (PM).

Figure 7:
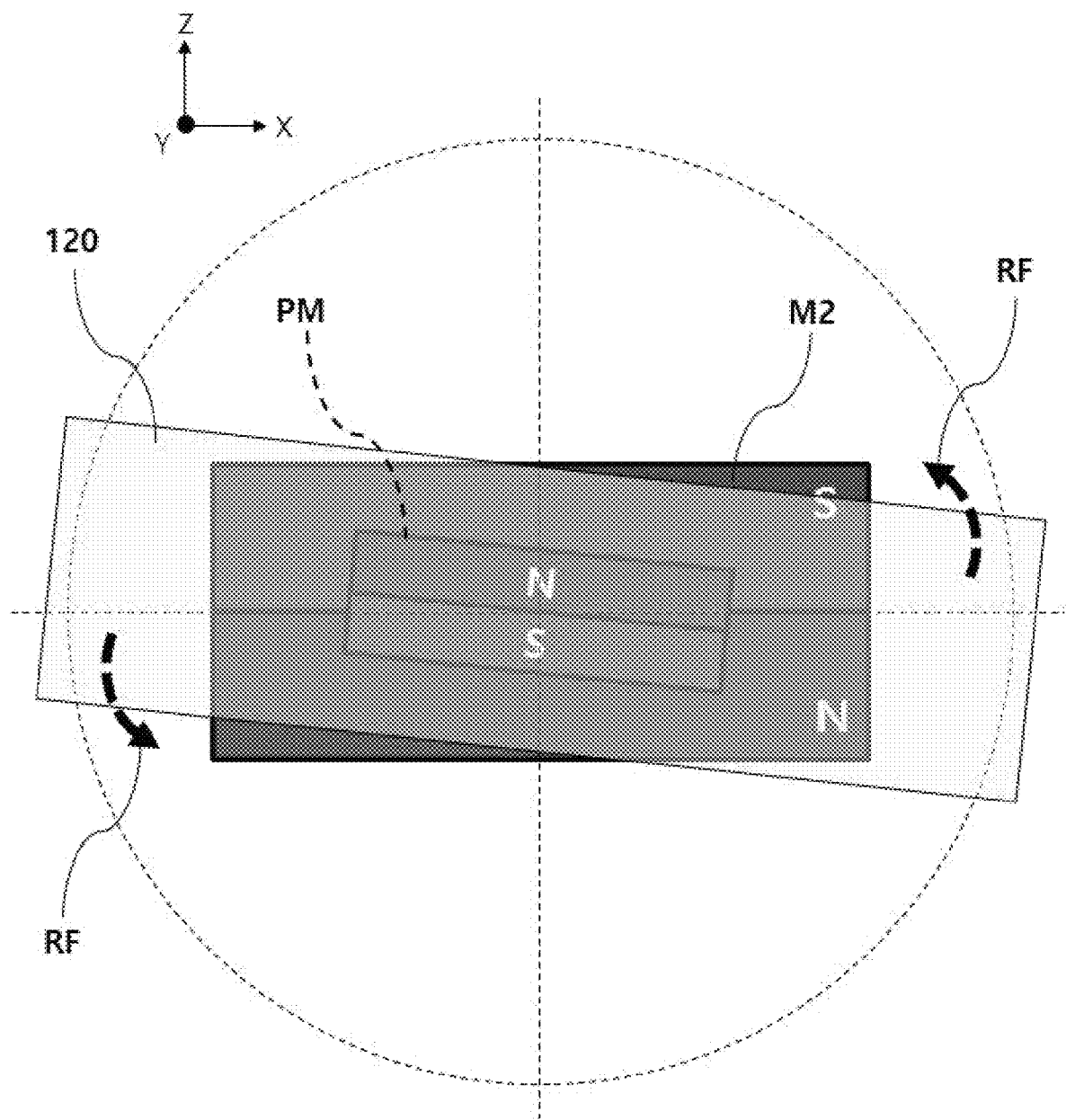
FIGS. 7 and 8 illustrate the working relationship for the pulling magnet.
Figure 8:
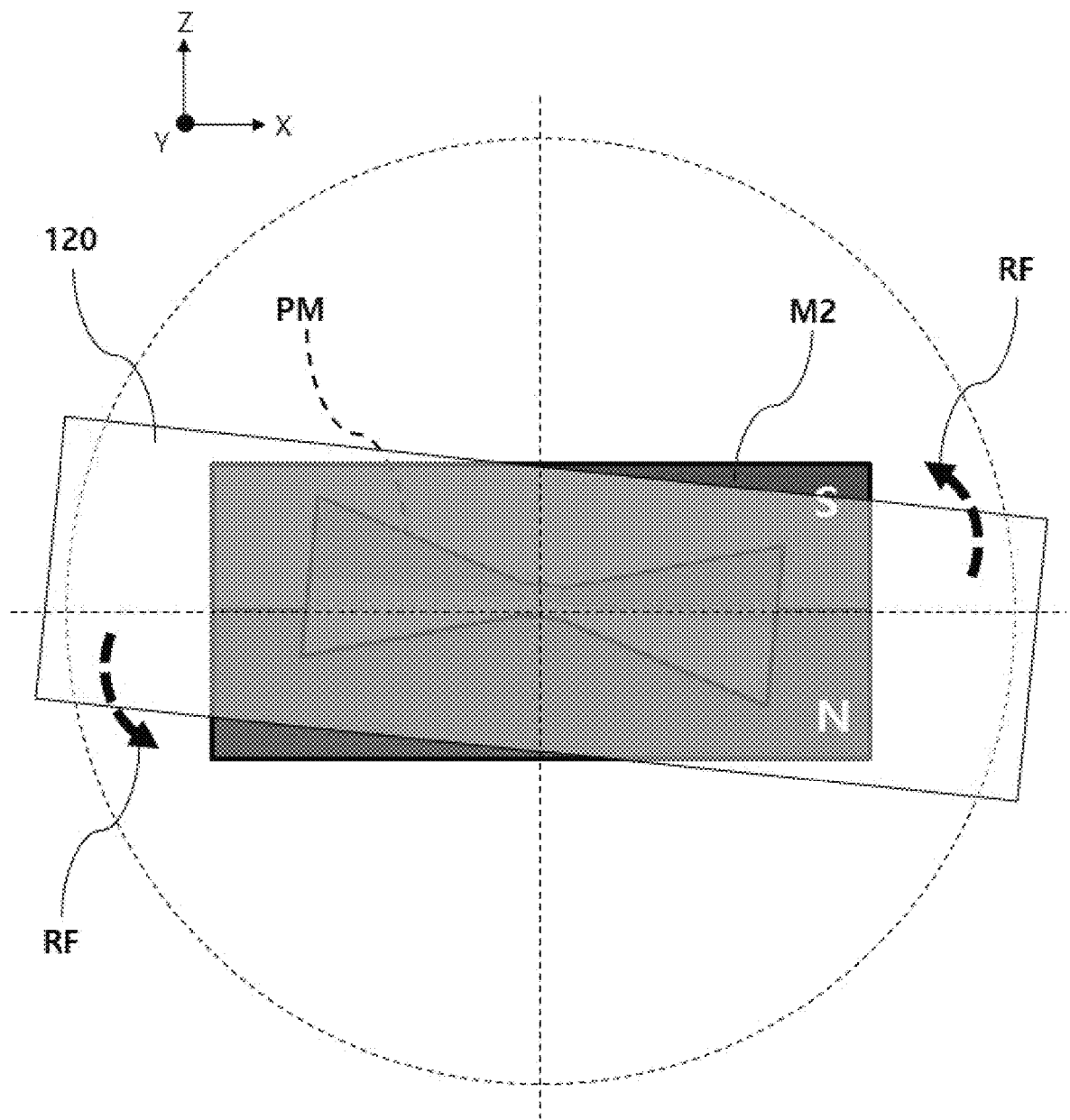

FIGS. 7 and 8 illustrate the working relationship of the pulling magnet (PM) with the elements.

As described previously, once power of appropriate magnitude and direction is applied to the first coil (C1), the magnetic force between the first coil (C1) and the first magnet (M1) rotates the carrier (120) about the X-axis direction, thereby making corrections to the X-axis component of the camera shake.

The rotation of carrier (120) in such fashion results in the pulling magnet (PM) attached to the carrier (120) moving together in the same motion to alter the relative position (posture) between the pulling magnet (PM) and the second magnet (M2) from alignment to misalignment.

When such an event as completion or interrupt of the OIS operation in the first direction takes place at the misaligned situation, a restoring force brought about e.g., by the attractive and repulsive forces between the facing magnetic pole (second magnet (M2)) and the counterpart magnetic pole (pulling magnet (PM)) is provided to the pulling magnet (PM) to readily return it to a reference position or posture (the default positon) where the pulling magnet (PM) and the second magnet (M2) are in alignment.

FIG. 7 illustrates an OIS in the first direction providing a carrier (120) equipped with a pulling magnet (PM) a restoring force to effect a counterclockwise rotation assuming a clockwise rotation of the carrier (120) at the end of driving.

Due to the rotational nature of the force returning the carrier (120) to its default position, it is preferred that the pulling magnet (PM) should take a shape elongated along a direction running parallel to the lengthwise direction of the second magnet (M2), for example, lengthwise through the magnetic pole boundaries of the second magnet (M2) so that the carrier (120) can be returned to the default position with minimal torque.

Furthermore, torque is proportional to the distance to the center of rotation and the acting force while magnetic force to the magnetic flux. Hence the pulling magnet (PM) preferably is configured as illustrated in FIG. 8 to have a surface facing the second magnet (M2) such that the peripheries of said surface are wider than the central region of said surface in order to provide sufficient adhesion between the carrier (120) and the middle guide (130) as well as more efficient rotational restoring force.

In embodiments where the peripheries of the pulling magnet (PM) are wider than the central region, the pulling magnet (M2) overall may have a slanted shape as illustrated in FIG. 8, or even can be patterned into steps.

Figure 9:
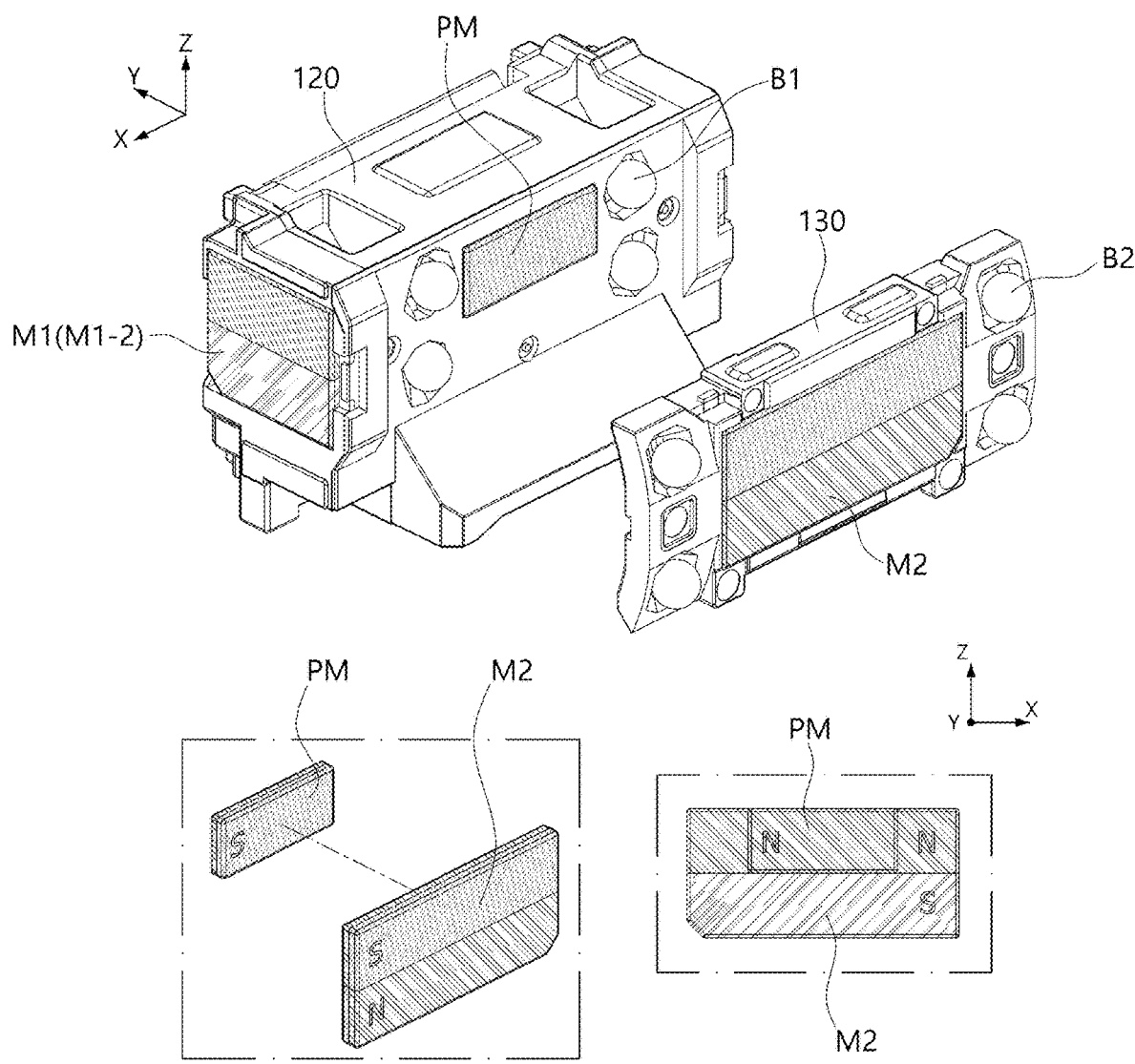
FIGS. 9 and 10 illustrate the configuration of a pulling magnet in accordance with another embodiment of the present invention.
Figure 10:
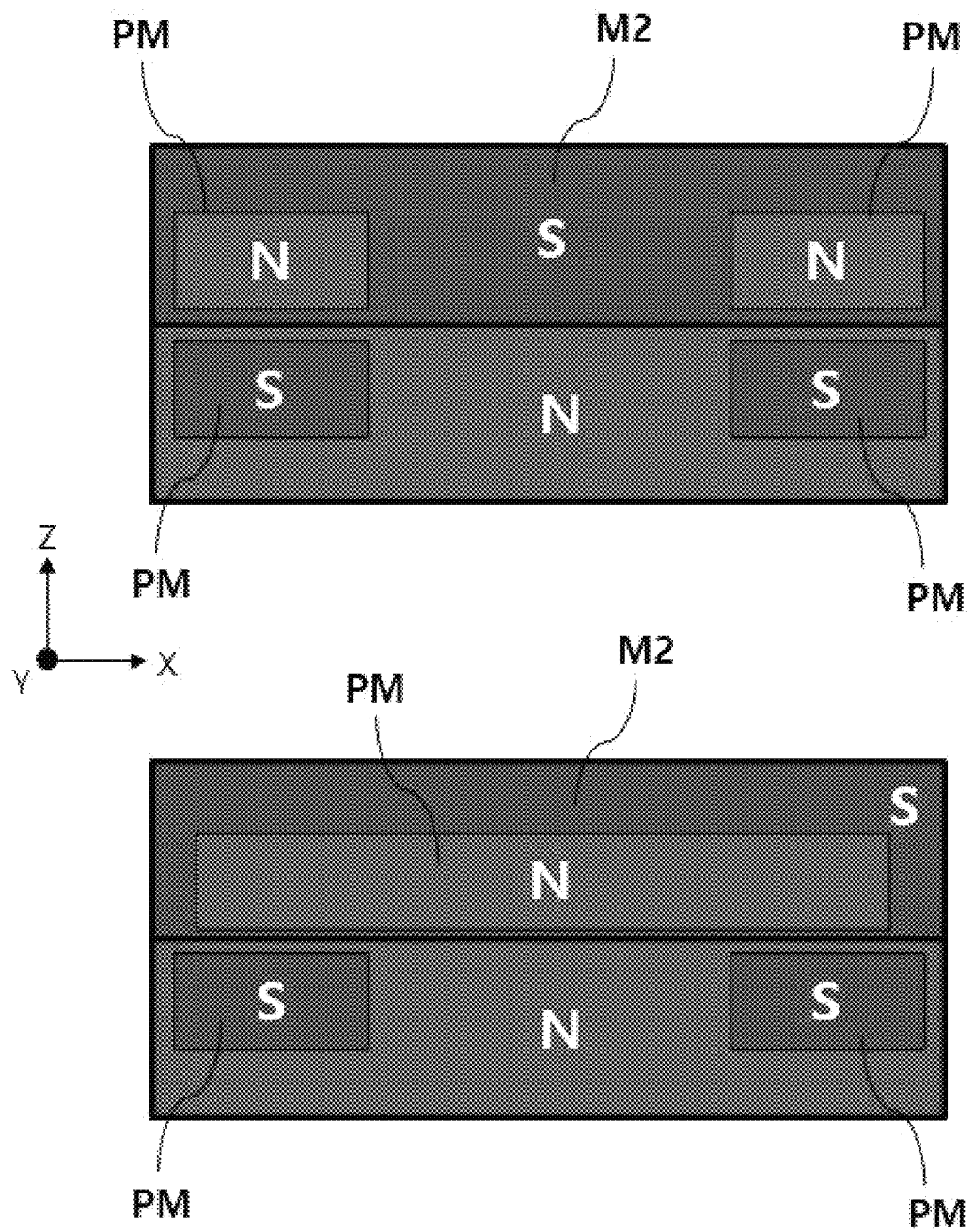

As illustrated in FIG. 9, even when a single magnetic pole (north or south) constitutes the magnetic pole (counterpart magnetic pole) of the pulling magnet (PM) that faces the second magnet (M2) at the aligned position, restoring force for the carrier (120) can still be generated as previously described by the attractive and repulsive forces between the counterpart magnetic pole and the second magnet (M2) upon rotation of the pulling magnet (PM). This allows various configurations for implementing the pulling magnet (PM) including the ones illustrated in FIG. 10 as long as both adhesion between the carrier (120) and the second magnet (M2) as well as magnetic torque are generated upon rotation of the carrier (120).

Meanwhile, the back yoke (170), as was previously explained e.g., in reference to FIG. 3, made out of magnetic material for such purpose as magnetic force focusing, is equipped to the middle guide (130) by such means as insert injection to face a side of the second magnet (M2), the side opposite to the one facing the second coil (C2).

A back yoke (170) inserted between the pulling magnet (PM) and the second magnet (M2) thus may militate against the adhesion between the pulling magnet (M2) and the second magnet (M2) as well as the restoring force (recovery to the default position) as it is made of magnetic material.

To address this issue, the back yoke (170) preferably has an opening (170S) formed in the area through which the second magnet (M2) faces the pulling magnet (PM) as illustrated in FIG. 3.

Figure 11:
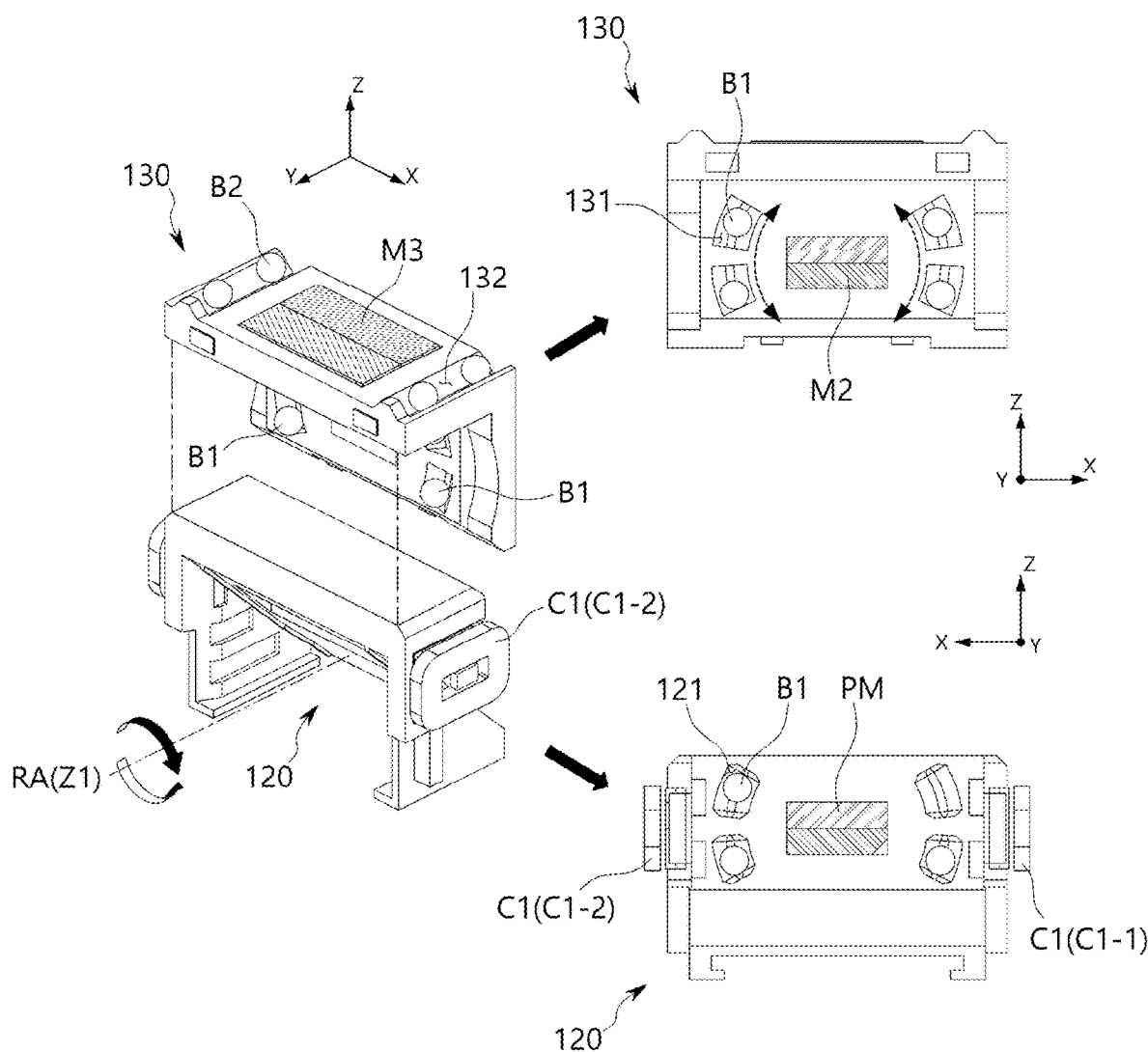
FIG. 11 illustrates the configuration of an actuator for reflectometer in accordance with another preferred embodiment of the present invention.

FIG. 11 illustrates the configuration of an actuator (100) in accordance with another preferred embodiment of the present invention.

The embodiments of the present invention described above are ones in which the magnet generating attractive and restoring forces in relation to the pulling magnet (PM) also serves as a driving magnet for driving the OIS operation in the second direction.

In contrast, in the embodiment illustrated in FIG. 11, the second magnet (M2) is used for generating attractive force and restoring force in relation to the pulling magnet (PM) while a separate magnet is used for driving OIS in the second direction.

For the embodiment illustrated in FIG. 11, the middle guide (130) that supports rotation of the carrier (120) about the first direction may take an overall folded shape. The driving magnet (M3) that drives rotation of the middle guide (130) about the second direction is placed at an upper location (along the Z-axis) to the middle guide (130), while the second coil (C2) attached to the housing (140) is placed to face the driving magnet (M3).

As has been previously mentioned, induction power of appropriate magnitude and direction on the second coil (C2) generates (electro) magnetic force between the second coil (C2) and the driving magnet (M3), and this force serves as the driving force that rotates the middle guide (130) about the second direction.

It would be obvious that both the second rail (132) formed on the middle guide (130) and the second guide (not shown) formed on the housing (140) to face to this second rail (132) may take a rounded shape to guide this rotation about the second direction.

In certain embodiments, both the second rail (132) that guides the movement of the second ball (B2) and the second guide (not shown) that faces the second rail (132) are shaped as a linear rail extended in a straight line along the Y-axis. In such case, (electro) magnetic force generated between the second coil (C2) and the driving magnet (M3) serves as the driving force that sets the middle guide (130) together with the carrier (120) in a linear motion along the linear, second rail (132) in the direction of the Y-axis.

Such linear movement along the Y-axis of the middle guide (130) shifts the optical path along the Y-axis to effect an OIS in the Y-axis direction where the light from the object has been led toward the image sensor (30) after being reflected by the reflectometer (110) attached to the carrier (120).

The same configuration applies for this embodiment as has been previously described for others, in which the facing magnetic pole of the second magnet (M2) equipped to the middle guide (130) faces the counterpart magnetic pole of the pulling magnet (PM) at matching locations. This allows not only to maintain the tight adhesion between the carrier (120) and the middle guide (130) but also to restore the carrier (120) to a position or posture in which the carrier (120) is in alignment or register with the middle guide (130) in the event of an OIS operation in the first direction ending or being interrupted.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In the above description of this specification, the terms such as "first" and "second" etc. are merely conceptual terms used to relatively identify components from each other, and thus they should not be interpreted as terms used to denote a particular order, priority or the like.

The drawings for illustrating the present disclosure and its embodiments may be shown in somewhat exaggerated form in order to emphasize or highlight the technical contents of the present disclosure, but it should be understood that various modifications may be made by those skilled in the art in consideration of the above description and the illustrations of the drawings without departing from the scope of the present invention.

REFERENCE SIGNS

1000: camera module
1100: housing
1200: circuit board
100: actuator
110: reflectometer
120: carrier
121: first guide
130: middle guide
131: first rail
132: second rail
140: housing
142: second guide
150: yoke plate
170: back yoke
170S: opening
M1: first magnet
M2: second magnet
M3: driving magnet
PM: pulling magnet
C1: first coil
C2: second coil
B1: first ball
B2: second ball

What is claimed is:

1. An actuator for reflectometer, the actuator comprising:
a carrier attached with a reflectometer and equipped with a first magnet;
a middle guide to support the rotation of the carrier about a first direction;
at least one first ball positioned between the carrier and the middle guide;
a second magnet equipped to the middle guide;
a pulling magnet equipped to the carrier and facing the second magnet;
a first coil to impart a driving force to the first magnet;
a housing to support the rotation of the middle guide about a second direction;
at least one second ball positioned between the housing and the middle guide; and
a second coil facing a first side of the second magnet opposite to a second side thereof facing the pulling magnet,
wherein the pulling magnet comprises a counterpart magnetic pole having an opposite polarity to a facing magnetic pole of the second magnet, said facing magnetic pole being positioned towards the pulling magnet.

2. The actuator according to claim 1, wherein the counterpart magnetic pole is positioned in correspondence to the location of the facing magnetic pole.

3. The actuator according to claim 1, wherein the pulling magnet has a shape elongated along a direction running parallel to the length of the second magnet.

4. The actuator according to claim 1, wherein the rotation of the carrier about the first direction takes place within a plane perpendicular to the direction toward which the carrier faces the middle guide.

5. The actuator according to claim 1, further comprising a back yoke equipped to the middle guide,
   wherein the back yoke is located facing the second side of the second magnet opposite to the first side thereof facing the second coil, and
   the back yoke has an opening formed in the area through which the second magnet faces the pulling magnet.

6. An actuator for reflectometer, the actuator comprising:
   a carrier attached with a reflectometer and equipped with a first magnet;
   a middle guide to support the rotation of the carrier about a first direction;
   at least one first ball positioned between the carrier and the middle guide;
   a second magnet equipped to the middle guide;
   a pulling magnet equipped to the carrier and facing the second magnet; and
   a first coil to impart a driving force to the first magnet,
   wherein the pulling magnet comprises a counterpart magnetic pole having an opposite polarity to a facing magnetic pole of the second magnet, said facing magnetic pole being positioned towards the pulling magnet, and
   wherein the pulling magnet has a surface facing the second magnet such that the peripheries of said surface are wider than the central region of said surface.

* * * * *